Aug. 24, 1948.  W. D. TEAGUE, JR  2,447,918
AIRCRAFT CABIN PRESSURE REGULATOR
Filed July 23, 1945

— CABIN PRESSURE CURVE —

— INVENTOR —
WALTER D. TEAGUE, JR.
By Herbert L. Davis, Jr.
— ATTORNEY —

Patented Aug. 24, 1948

2,447,918

UNITED STATES PATENT OFFICE 2,447,918

AIRCRAFT CABIN PRESSURE REGULATOR

Walter Dorwin Teague, Jr., Alpine, N. J., assignor to Bendix Aviation Corporation, Teterboro, N. J., a corporation of Delaware Application July 23, 1945, Serial No. 606,509

11 Claims. (Cl. 98—1.5)

1

The present invention relates to a cabin pressure control mechanism for maintaining a predetermined pressure in the cabin of an aircraft and more particularly to a novel regulator mechanism for an air outflow valve of a supercharged aircraft cabin.

An object of the invention is to provide a novel control mechanism for effecting the pressure of a supercharged aircraft cabin so as to cause the pressure to follow a predetermined series of values as the prevailing atmospheric pressure decreases or increases.

Another object of the invention is to provide a novel arrangement for controlling the pressure of a supercharged cabin in response to atmospheric and cabin pressure responsive means, in which the datum of the cabin pressure responsive means may be varied upon change in the prevailing atmospheric pressure.

Another object of the invention is to provide novel means whereby the rate of change in the datum of the cabin pressure responsive means may be varied in accordance with the prevailing atmospheric pressure.

Another object of the invention is to provide novel means for adjusting the latter rate of change.

Another object of the invention is to provide a novel linkage arrangement for interconnecting an atmospheric and cabin pressure responsive means so as to control a motor means for positioning an outflow valve for a supercharged cabin in accordance with changes in the atmospheric pressure.

Another object of the invention is to provide a novel linkage arrangement in which first and second spring members act in opposition to the atmospheric pressure applied to the atmospheric pressure responsive means, including novel means for placing one of the spring members out of operative relation upon a predetermined decrease in atmospheric pressure.

Another object of the invention is to provide a novel control apparatus in which there is provided a first condition responsive means and a control member operated thereby to regulate the first condition, and a second condition responsive means for changing the setting of said first condition responsive means in accordance with a predetermined program.

Another object of the invention is to provide first and second spring members coacting with the latter second condition responsive means and means for connecting said spring members in and

2 out of operative relation dependent upon the value of the second condition.

Another object of the invention is to provide a novel cabin pressure control mechanism operative upon change in the prevailing atmospheric pressure to cause the cabin pressure to follow a predetermined program.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

Figure 1:
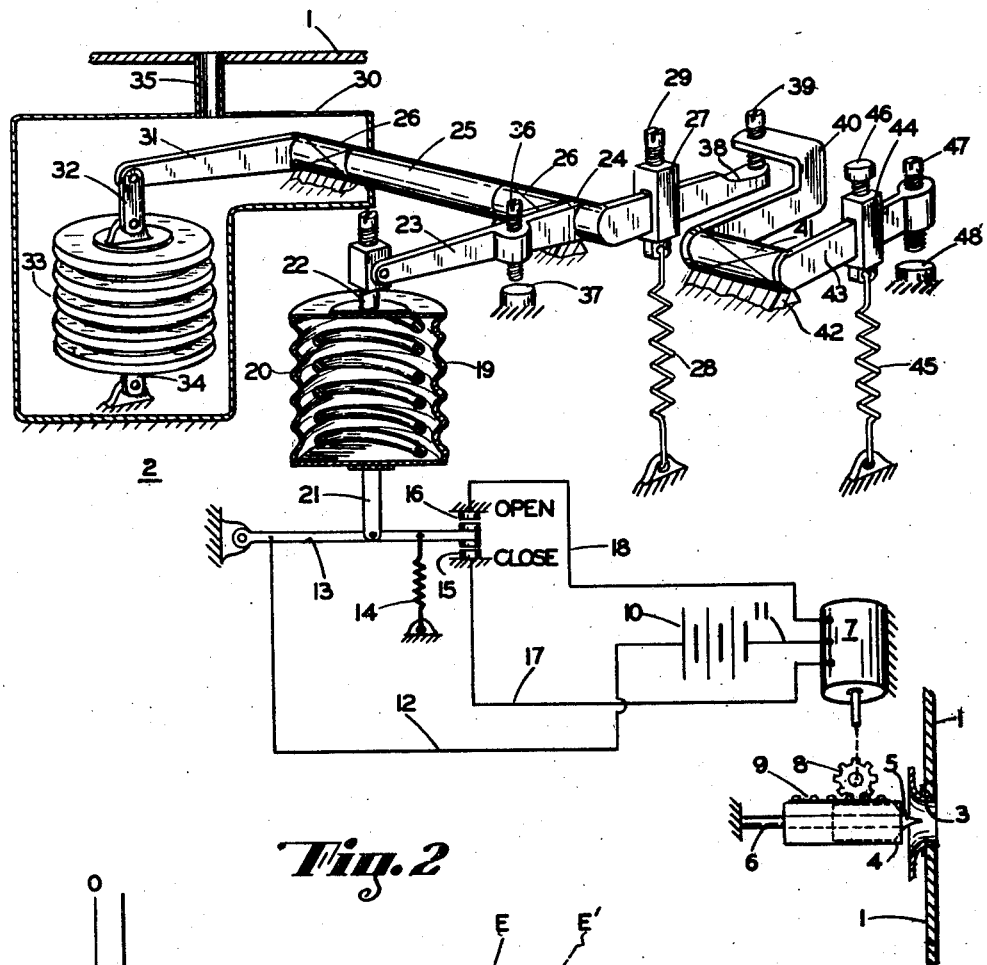
Figure 1 is a diagrammatic view of a control mechanism embodying the invention.

The invention as shown in Figure 1 may be applied to a sealed aircraft cabin 1 having the interior 2 supplied with air under superatmospheric pressure by a supercharger or other suitable source of air under pressure.

An air outflow passage 3 opens through the wall 1 of the cabin to the atmosphere. The latter passage 3 is controlled by a sleeve valve 4 slidably mounted on a member 5 supported by a pin 6. The sleeve valve 4 and supporting member 5 are preferably of a type described and claimed in my copending application Serial No. 524,063 filed February 26, 1944, now Patent No. 2,441,088.

The sleeve valve 4 may be operated by an air motor piston as described in the latter copending application and having a control valve operated by the herein described regulator mechanism or the sleeve valve 4 may be positioned by a suitable hydraulic servomotor means controlled by a servo valve adjustably positioned by the regulator mechanism shown in Figure 1.

In the form of the invention shown in Figure 1, the sleeve valve 4 is shown as positioned by a reversible electric motor 7 which drives a pinion 8 engaging a rack 9 so as to adjust the position of the sleeve valve 4 in relation to the air outflow passage 3.

A source of electrical energy 10 has one terminal connected in circuit with the reversible motor 7 through an electrical conductor 11. A second electrical conductor 12 leads from the opposite terminal to a control member or switch arm 13 biased under tension of a light spring 14 in a clockwise direction. The control member or switch arm 13 controls contacts 15 and 16 which are connected through conductors 17 and 18 respectively to the motor 7 so as to control the direction of rotation of the motor 7 in a manner well known in the art.

Thus upon the switch arm 13 moving in a clockwise direction closing the contact 16, the motor 7 will rotate in a direction imparting longitudinal movement to the sleeve valve 4 towards the right tending to close the air outflow passage 3.

The control member 13 is adjustably positioned by an evacuated bellows 19 having a suitable expansion spring 20 mounted within the bellows 19 and in opposition to the cabin air pressure applied to the exterior thereof. One end of the bellows 19 is pivotally connected by a link 21 to the arm 13, while the other end of the bellows 19 is connected by an adjustable screw 22 to one end of a lever 23. The lever 23 is pivotally connected to the screw 22. The lever 23 is affixed at a point 24 intermediate its opposite ends to a shaft 25 rotatably mounted in bearings 26. A slidable member 27 is provided on the lever arm 23 for operably connecting a spring member 28 to the lever 23. The spring member 28 tends to bias the lever 23 in a clockwise direction and the slidable member 27 has an adjustable fastening screw 29 whereby the member 27 may be adjustably positioned on the lever 23 for varying the effect of the spring 28 as will be explained.

The shaft 25 extends into a sealed casing 30 and there is affixed to the shaft 25 within the sealing casing 30 an arm 31. Connected to the free end of the arm 31 by a link 32 is one end of an evacuated bellows 33 which has its opposite end fixedly supported by a pin 34. The interior of the sealed casing 30 is opened through a conduit 35 to the atmospheric pressure.

In the latter arrangement it will be readily seen that the spring 28 tends to bias the lever 23, shaft 25 and arm 31 in a clockwise direction in opposition to the atmospheric pressure acting upon the bellows 33 and the cabin pressure acting upon the bellows 19.

The bellows 19 is thus shifted upward in response to a decrease in atmospheric pressure and downward upon an increase in atmospheric pressure so as to change the setting thereof.

It will be noted that the cabin pressure acts directly upon the bellows 19 so as to cause the contraction of the bellows 19 upon an increase in cabin pressure. Such contraction of the bellows 19 will cause switch arm 13 to close contact 16 whereupon servo motor 7 will move sleeve valve 4 in a valve opening direction so as to decrease the cabin pressure to the predetermined value for which bellows 19 is set. Of course, upon cabin pressure decreasing below the predetermined value expansion of the bellows 19 will cause switch arm 13 to close contact 15 causing servo motor 7 to rotate in an opposite direction so that the sleeve valve 4 will be moved in a valve closing direction so as to decrease the air outflow and thereby increase the cabin pressure to the predetermined value for which bellows 19 is set.

Movement of the lever 23 in a counterclockwise direction or in a direction for increasing the pressure setting of the bellows 19 in response to increased atmospheric pressure, is limited by an adjustment screw 36.

The screw 36 is arranged to engage an abutment member 37 so as to limit further adjustment of the setting or datum of bellows 19 in a pressure increasing direction. Thus upon the atmospheric pressure rising to a value determined by the adjustment of the screw 36 the pressure setting of the bellows 19 will not be increased further and the pressure of the cabin will be maintained substantially constant at the latter adjusted value as indicated between the points B and C of the curve of Figure 2. Upon the atmospheric pressure rising to a value above that for which the bellows 19 is set, then of course inflowing air through passage 3 will increase the cabin pressure to atmospheric pressure as indicated between points A and B of the curve of Figure 2.

The free end 38 of the lever 23 is arranged to operably engage an adjustable screw 39 carried by an arm 40 fixedly mounted at one end of a shaft 41 rotatably mounted in a bearing 42. Fixedly mounted at the opposite end of the shaft 41 is an arm 43 on which is slidably mounted a member 44 for operably connecting a spring member 45 to the arm 43. The slidable member 44 has an adjustably fastening screw 46 whereby the member 44 may be adjustably positioned on the arm 43 for varying the effect of the spring 45 as will be explained.

The spring 45 biases the arms 40 and 43 in a clockwise direction and the screw 39 into contacting relation with the free end 38 of the lever 23 so as to augment the force of the spring 28 acting upon the lever 23 and tending to force the lever 23 in a clockwise direction.

An adjustable screw 47 is provided in the free end of the arm 43 and is arranged to engage an abutment 48 so as to limit the extent of movement of the arm 43 under force of the spring 45 and the extent of application of the force of spring 45 to the lever 23.

Figure 2:
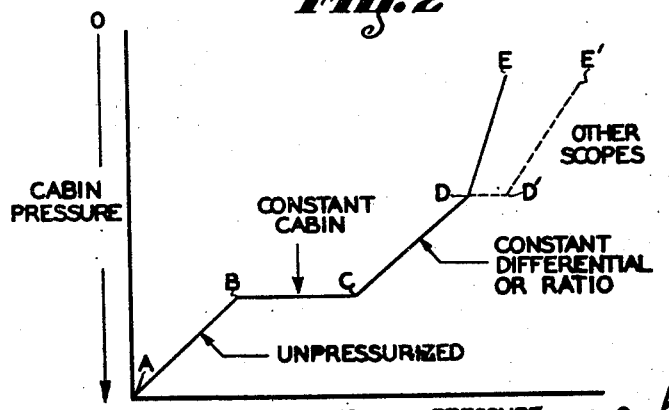
Figure 2 is a graph illustrating a typical cabin pressure curve attained by use of the invention as a regulator for an outflow valve of a supercharged aircraft cabin.

Thus for example, upon the atmospheric pressure being at a value on the curve of Figure 2 between the points C and D, the relative position of the mechanism parts will be as shown in Figure 1, and springs 28 and 45 will both be applying a force to the arm 23 in opposition to the atmospheric pressure acting upon bellows 33.

The latter spring forces may be so arranged as to change the setting of the bellows 19 in response to change in atmospheric pressure at a rate which will maintain a predetermined constant differential between cabin and atmospheric pressures, or a predetermined ratio between cabin and atmospheric pressure, or the springs 28 and 45 may be so arranged as to provide other desired predetermined relationship between the cabin and atmospheric pressures, or a program of cabin pressures for prevailing atmospheric pressures.

The screw 47 may be adjusted so as to contact the abutment 48 upon the atmospheric pressure decreasing to a value indicated on the curve of Figure 2 by the point D. Thus upon a further decrease in atmospheric pressure the spring 45 will be cut out of operation and the spring 28 will apply the sole biasing force to the lever 23 at a rate dependent upon the spring rate of the spring 28. In the latter action the free end of the lever 23 will move out of engagement with the adjustment screw 39 under force of the spring 28.

The force of the springs 28 and 45 may be so arranged that the screw 47 may engage abutment 48 at the contraction limit of the spring 45 so that there is but a slight or gradual decrease in the spring force applied to the lever 23, upon the lever 23 disengaging the adjustment screw 39. The spring 28 is preferably arranged so that the setting of the bellows 19 may be varied in response to change in the atmospheric pressure at a rate greater or at a different rate than when the springs 28 and 45 act jointly upon the lever 23 as indicated for example by the pressure curve in Figure 2 between D and E.

The springs 28 and 45 may be arranged, however, as indicated by the dotted line of Figure 2 so that upon the screw 47 contacting the abutment 48 a sufficient difference in the forces applied will result that upon further decrease in the atmospheric pressure a constant cabin pressure may be maintained as indicated by the dotted lines between letters D and D' of Figure 2. Upon a predetermined minimum atmospheric pressure being reached the cabin pressure setting may be decreased at a predetermined rate in response to decrease in atmospheric pressure as indicated by the dotted line $D_1$ and $E_1$ of Figure 2.

From the foregoing it will be readily seen that through the latter arrangement spring elements may be connected in and out of the control mechanism at predetermined atmospheric pressure levels so that the setting or datum of the bellows 19 may be varied with atmospheric pressure at predetermined rates.

These rates of change of the pressure setting may be conveniently adjusted by the adjustment of the slide members 27 and 44. Moreover, the atmospheric pressure level at which the datum changing means is cut into operation may be conveniently varied by adjustment of the stop screw 36, while the atmospheric pressure lever at which the spring 45 is cut out of operation may be varied by the adjustment of the stop screw 47. The initial setting of the bellows 19 may be conveniently varied by the adjustment of the screw 22.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A mechanism for controlling the pressure within a supercharged aircraft cabin, comprising a cabin pressure responsive means, atmospheric pressure responsive means, an air outlet valve for said cabin, a motor for positioning said valve, control means for said motor operatively connected to said cabin pressure responsive means, means for movably supporting the cabin pressure responsive means, means operably connecting said atmospheric pressure responsive means to said supporting means for adjusting the position of said cabin pressure responsive means to change the datum thereof, spring means, and a mechanism for transmitting force from said spring means to said supporting means and arranged to vary the rate of operation of said datum changing means.

2. A mechanism for controlling the pressure within a supercharged aircraft cabin, comprising a cabin pressure responsive means, atmospheric pressure responsive means, an air outlet valve for said cabin, a motor for positioning said valve, control means for said motor operatively connected to said cabin pressure responsive means, means for movably supporting said cabin pressure responsive means, means operably connecting said atmospheric pressure responsive means to said supporting means for adjusting the position of said cabin pressure responsive means to change the datum thereof, spring means connected to said supporting means, including spring rate changing means to vary the rate of change of the datum of said cabin pressure responsive means.

3. A mechanism for controlling the pressure within a supercharged aircraft cabin, comprising a cabin pressure responsive means, atmospheric pressure responsive means, an air outlet valve for said cabin, a motor for positioning said valve, control means for said motor operatively connected to said cabin pressure responsive means, means for movably supporting the cabin pressure responsive means, means operably connecting said atmospheric pressure responsive means, to said supporting means for adjusting the position of said cabin pressure responsive means to change the datum thereof, a pair of springs, one of said springs connected to said supporting means, a mechanism for transmitting force from the other spring to the supporting means, and stop means for rendering said mechanism inoperative at a predetermined atmospheric pressure so as to vary the datum changing rate.

4. The combination comprising aircraft cabin pressure responsive means, atmospheric pressure responsive means, a lever operably connecting said cabin and atmospheric pressure responsive means, spring means connected to said lever and biasing said lever in a direction opposing the atmospheric pressure applied to said atmospheric pressure responsive means, a movable support for said cabin pressure responsive means, said lever arranged to adjust the position of said support in order to change the datum of said cabin pressure responsive means upon change in atmospheric pressure, and means for controlling the aircraft cabin pressure operatively connected to said cabin pressure responsive means.

5. The combination comprising aircraft cabin pressure responsive means, atmospheric pressure responsive means, a lever operably connecting said cabin and atmospheric pressure responsive means, spring means connected to said lever and biasing said lever in a direction opposing the atmospheric pressure applied to said atmospheric pressure responsive means, a movable support for said cabin pressure responsive means, said lever arranged to adjust the position of said support in order to change the datum of said cabin pressure responsive means upon change in atmospheric pressure, means for controlling the aircraft cabin pressure operatively connected to said cabin pressure responsive means, an auxiliary spring, means for transmitting force from said auxiliary spring to said lever, means operative at a predetermined setting of said lever to render said force transmitting means inoperative so as to effect a change in the datum varying rate.

6. The combination comprising aircraft cabin pressure responsive means, atmospheric pressure responsive means, a lever operably connecting said cabin and atmospheric pressure responsive means, spring means connected to said lever and biasing said lever in a direction opposing the atmospheric pressure applied to said atmospheric pressure responsive means, a movable support for said cabin pressure responsive means, said lever arranged to adjust the position of said support in order to change the datum of said cabin pressure responsive means upon change in atmospheric pressure, means for controlling the aircraft cabin pressure operatively connected to said cabin pressure responsive means, an auxiliary spring, means for transmitting force from said auxiliary spring to said lever, means operative at a predetermined setting of said lever to render said force transmitting means inoperative so as to effect a change in the datum varying rate, and stop means carried by said lever for limiting the range of operation of said datum changing means.

7. The combination comprising aircraft cabin pressure control means, a first expansible bellows subject to atmospheric pressures, a second expansible bellows subject to aircraft cabin pressures, a lever operably connected to said first bellows, one end of the second bellows operably connected to said lever and supported thereby and the other end of said bellows operably connected to said control means, and spring means biasing said lever in a direction opposing the cabin and atmospheric pressures acting upon said first and second bellows, whereby the pressure setting of said second bellows may be varied in accordance with the atmospheric pressure acting upon the first bellows.

8. The combination comprising aircraft cabin pressure control means, a first expansible bellows subject to atmospheric pressures, a second expansible bellows subject to aircraft cabin pressures, a lever operably connected to said first bellows, one end of the second bellows operably connected to said lever and supported thereby and the other end of said bellows operably connected to said control means, spring means biasing said lever in a direction opposing the cabin and atmospheric pressures acting upon said first and second bellows, auxiliary spring means, means for transmitting force from said auxiliary spring means to said lever, and means for adjusting said transmitting means in and out of operative relation to said lever dependent upon the prevailing atmospheric pressure.

9. The combination comprising aircraft cabin pressure control means, a first expansible bellows subject to atmospheric pressures, a second expansible bellows subject to aircraft cabin pressures, a lever operably connected to said first bellows, a movable support for one end of said second bellows, said movable support operably connected to said lever, the other end of said second bellows operably connected to said control means and arranged so as to regulate said control means in accordance with a pressure setting dependent upon the prevailing atmospheric pressure.

10. The combination comprising aircraft cabin pressure control means, a first expansible bellows subject to atmospheric pressures, a second expansible bellows subject to aircraft cabin pressures, a lever operably connected to said first bellows, a movable support affixed to one end of said second bellows, said movable support operably connected to said lever, the other end of said second bellows connected to the control means, and spring means biasing the lever in a direction opposing the cabin and atmospheric pressures acting upon said first and second bellows.

11. A mechanism for controlling the pressure within a supercharged aircraft cabin, comprising a first expansible bellows subject to atmospheric pressure, a second expansible bellows subject to aircraft cabin pressure, a reversible electric motor means for controlling the aircraft cabin pressure, electric switch means for controlling the direction of rotation of the motor means, a lever operably connected to said first bellows, said second bellows having one end operably connected to said lever and the other end connected to said switch means so as to suspend said second bellows between said lever and switch means in such a manner as to effect control of said motor means in accordance with the cabin pressure, and spring means acting upon said lever in a direction opposing the cabin and atmospheric pressures applied to said first and second bellows so that the pressure setting of said second bellows may be varied in response to changes in atmospheric pressure and at a rate dependent upon said spring means.

WALTER DORWIN TEAGUE, JR.

REFERENCES CITED

The following references are of record in the file of this patent:

UNITED STATES PATENTS

| Number | Name | Date |
|---|---|---|
| 2,208,554 | Price | July 16, 1940 |
| 2,374,708 | Shoults | May 1, 1945 |
| 2,391,197 | Schwein | Dec. 18, 1945 |
| 2,396,116 | Noxon | Mar. 5, 1946 |
| 2,407,257 | Del Mar | Sept. 10, 1946 |
| 2,419,707 | Cooper et al. | Apr. 29, 1947 |